UNITED STATES PATENT OFFICE.

NILS TESTRUP, OF LONDON, ENGLAND, AND THOMAS RIGBY, OF DUMFRIES, SCOTLAND, ASSIGNORS TO WETCARBONIZING LIMITED, OF WESTMINSTER, LONDON, ENGLAND.

FERTILIZER FROM PEAT AND PROCESS OF MAKING THE SAME.

1,277,155. Specification of Letters Patent. Patented Aug. 27, 1918.

No Drawing. Application filed July 29, 1915. Serial No. 42,582.

*To all whom it may concern:*

Be it known that we, NILS TESTRUP, a subject of the King of Great Britain and Ireland, and residing at 3 Dean Farrar street, London, England, and THOMAS RIGBY, a subject of the King of Great Britain and Ireland, and residing at 61 Loreburn street, Dumfries, Scotland, have invented certain new and useful Improvements in Fertilizer from Peat and Processes of Making the Same, of which the following is a specification.

This invention relates to the utilization of peat as a fertilizer for soils and as an absorbent for ammonia.

As a result of experiment we have found that peat, which in a wet condition has been subjected to heat to produce without evaporation such a change therein as renders the bulk of the water readily expressible as in the process of wetcarbonizing described for example in British patent specifications Nos. 10834 of 1903, 17610 of 1911, 17427 of 1912, 5873, 9392 and 11133 of 1913 has an enhanced fertilizing effect when used as a dressing on soils of low agricultural value on account of their porosity. This result is apparently attributable at least to some extent, to the fact that the treated peat having been deprived of its slimy and water binding character and rendered more or less spongy acts to retain water in the soil by preventing too rapid drainage thereof and that it is in a condition in which the valuable fertilizing constituents of the mass are rendered available to an increased extent.

We have also observed that after such heat treatment the peat has an increased affinity for ammonia, which presumably forms with the humic acids or analogous substances compounds of sufficient stability not to part with ammonia certainly at temperatures below 100% C. and probably not even until a much higher temperature is attained. Such substance we have found also increases the value of the peat as a fertilizer.

The invention consists therefore in a fertility-increasing soil-dressing prepared from peat and the process of producing the same.

It also consists in utilizing such peat as an absorbent or fixing agent for ammonia and further in utilizing the resulting substance as a fertilizer.

In carrying the invention into effect the water binding properties of excavated peat are more or less destroyed by passing the peat through tubular apparatus wherein it is heated to a temperature of from 100° to 180° C. under pressure sufficient to prevent ebullition as set forth in the before-mentioned patent specifications. The peat is treated in this way until the bulk of the water is liberated, and then dewatered to an extent depending upon the form in which it is ultimately to be used as a dressing, that is to say, whether as filter press cake material having a water content of about 68% or as a powder admixed if desired with other material and subsequently dried to a greater extent.

Under such conditions the heat treated peat may also be used for the absorption of ammonia such as from producer gas obtained by the gasification of peat. The results obtainable depend largely upon the character of the peat itself, for we have found that a well decomposed peat containing a large percentage of ash did not absorb so much ammonia after heat treatment as one containing less ash, presumably on account of humic acid in the peat being neutralized by alkali in the ash. A young peat which had been treated and dewatered to a fairly dry and dusty condition was found after exposure to gases containing ammonia to have had its original nitrogen content increased from 1.25 to 4.9 per cent.

Apart from the reduced cost which such a method offers of preparing peat for use as an ammonia absorbent, the fixed nitrogen is rendered available in an easily assimilable form for manuring and fertilizing purposes. The product thus obtained is therefore suitable for use as a fertilizer, and if the agricultural land to be thus treated is conveniently situated to the factory where the peat is heat treated, the dewatering of the peat is carried out to a lesser extent by drying that portion of the peat which is consumed in generating heat and power to a greater extent than the material to be used as the fertilizer or as the absorbent for ammonia or for both purposes.

Having now described our invention what we claim as new and desire to secure by Letters Patent is:—

1. A process of making fertilizer from peat consisting in subjecting peat to heat under pressure sufficient to prevent evaporation to destroy its water binding properties, dewatering said peat to any desired extent, and exposing the treated peat to gases containing ammonia.

2. A process of making fertilizer from peat consisting in subjecting it to heat under pressure sufficient to prevent evaporation to destroy its water binding properties, dewatering said peat to any desired extent, and employing the resulting material as an absorbent for ammonia.

3. A process of making fertilizer from peat consisting in subjecting peat to a temperature of from 100 to 180° C. under pressure sufficient to prevent evaporation to destroy its water binding properties, dewatering said peat to any desired extent, and exposing the treated peat to gases containing ammonia.

4. A process of making fertilizer from peat consisting in subjecting the peat to heat under pressure sufficient to prevent evaporation, dewatering the resulting material, subjecting part thereof to gasification and utilizing another part to absorb ammonia from the gases so produced.

5. A process of making fertilizer from peat consisting in subjecting the peat to heat under pressure sufficient to prevent evaporation, reducing the water content of the material to not more than about 68 per cent., subjecting part thereof to gasification, and utilizing another part to absorb ammonia from the gases thus generated.

6. A process of making fertilizer from peat consisting in subjecting the peat to a temperature of from 100 to 180° C. under pressure sufficient to prevent evaporation, dewatering the resultant material, subjecting part thereof to gasification, under ammonia production conditions, and utilizing another part to absorb ammonia from the gases thus generated.

7. Fertilizer comprising peat substantially free from water-binding properties and having ammonia absorbed therein.

8. Fertilizer comprising peat substantially free from water-binding properties and of reduced water-content, and having ammonia absorbed therein.

In testimony whereof we have signed our names to this specification.

NILS TESTRUP.
T. RIGBY.

It is hereby certified that in Letters Patent No. 1,277,155, granted August 27, 1918, upon the application of Nils Testrup, of London, England, and Thomas Rigby, of Dumfries, Scotland, for an improvement in "Fertilizer from Peat and Processes of Making the Same," an error appears in the printed specification requiring correction as follows: Page 1, line 43, for the numerals and per cent. mark "100%" read the numerals and degree-mark *100°;* and that the said Letters Patent should be read with this correction therein that the same may conform to the record of the case in the Patent Office.

Signed and sealed this 8th day of October, A. D., 1918.

[SEAL.]

R. F. WHITEHEAD,
*Acting Commissioner of Patents.*

Cl. 71—6.